United States Patent [19]
Jansson et al.

[11] Patent Number: 6,094,781
[45] Date of Patent: Aug. 1, 2000

[54] HANDLE WITH MARKING

[75] Inventors: Conny Jansson, Enköping; Hans Himbert; Håkan Bergkvist, both of Bromma, all of Sweden

[73] Assignee: Sandvik AB, Sandviken, Sweden

[21] Appl. No.: 09/142,872

[22] PCT Filed: Mar. 13, 1997

[86] PCT No.: PCT/SE97/00432

§ 371 Date: Jan. 12, 1999

§ 102(e) Date: Jan. 12, 1999

[87] PCT Pub. No.: WO97/34740

PCT Pub. Date: Sep. 25, 1997

[30] Foreign Application Priority Data

Mar. 19, 1996 [SE] Sweden ................................. 9601035

[51] Int. Cl.[7] ................................. A47J 45/00; E05B 1/00
[52] U.S. Cl. ................................. 16/431; 16/436; 16/902; 16/DIG. 18; 16/DIG. 19; 74/543; 74/553; 40/913; 40/628; 81/489; 81/436; 81/177.1; 81/DIG. 5
[58] Field of Search ............................... 16/431, 436, 430, 16/902, 441, DIG. 12, DIG. 18, DIG. 19; 74/551.9, 543, 553; 40/913, 625, 628; 81/489, 436, 177.1, DIG. 5

[56] References Cited

U.S. PATENT DOCUMENTS

| | | | |
|---|---|---|---|
| 2,202,253 | 5/1940 | Hiatt | 40/616 |
| 2,586,978 | 2/1952 | Murray | 40/616 |
| 4,835,890 | 6/1989 | Nelson et al. | 40/616 |
| 5,050,269 | 9/1991 | Engstrom et al. | 16/433 |
| 5,261,665 | 11/1993 | Downey | 16/DIG. 12 |
| 5,290,063 | 3/1994 | Lenhart | 16/DIG. 12 |
| 5,421,224 | 6/1995 | Bond | |
| 5,740,586 | 4/1998 | Gomas | 16/436 |

FOREIGN PATENT DOCUMENTS

| | | |
|---|---|---|
| 0 546 915 | 6/1993 | European Pat. Off. |
| 43 04 965 A1 | 2/1993 | Germany |
| 43 43 650 650 | 12/1993 | Germany |
| 503 066 | 3/1996 | Sweden |
| WO87/05487 | 9/1987 | WIPO |

*Primary Examiner*—Chuck Y. Mah
*Attorney, Agent, or Firm*—Burns, Doane, Swecker & Mathis, L.L.P.

[57] ABSTRACT

A handle for tools such as screwdrivers where an end region is shaped as a smooth rounded surface and made by injection molding in multiple steps from at least two differently colored plastic materials, which are tactilely indistinct, to form a visible marking for identification of the tool.

4 Claims, 1 Drawing Sheet

Fig. 1
Fig. 2
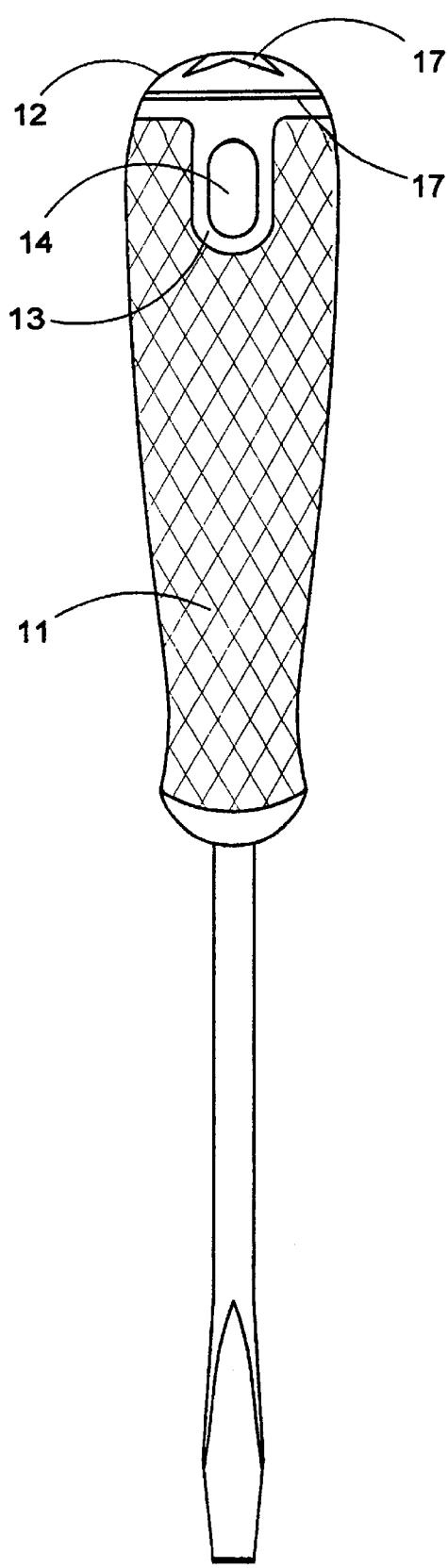
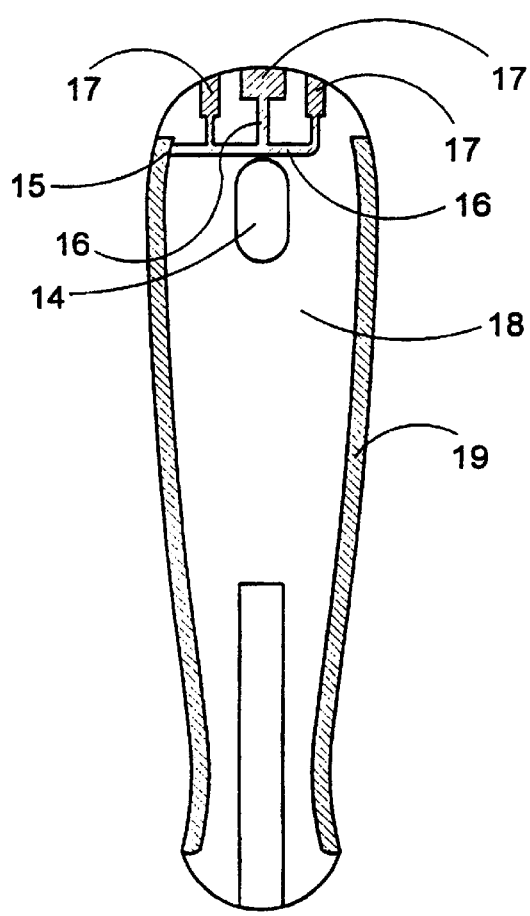

HANDLE WITH MARKING

FIELD OF THE INVENTION

The invention concerns a handle for tools, with indelible and wear-proof marking of the end surface without reducing the comfort or usefulness of the tool.

BACKGROUND OF THE INVENTION

It has long been known that tools comprising a metal part and a handle from plastic material can be marked on the upper end surface of the handle by painting or printing, where the marking can provide information about the type, size, catalogue number or manufacturer of the tool. The end surface is, however, often subjected to severe wear by friction against the hand as with screwdrivers, or by impacts as with chisels, tending to make the marking illegible.

It is also known from patent U.S. Pat. No. 5,421,224 to mark handles for tools such as screwdrivers by moulding a characteristic raised or recessed symbol on a flat delimited part of the end surface. This will allow identification of the tool even in darkness, but does not allow the handle end to rotate smoothly and comfortably against the skin of the hand.

It is also known from patent DE 43 43650 to make the handle end surface with a separately made plug insert, distinguished by painting, printing or contrasting colour. In such case it is also difficult to make the end surface smooth enough for comfortable use of a screwdriver. If used on a handle of a chisel, the plug is likely to loosen, and stronger fixation by threads is expensive to make and assemble.

BRIEF DESCRIPTION OF THE DRAWINGS

FIG. 1 is a side elevational view of the tool according to the present invention; and FIG. 2 is a cross-sectional view of the tool according to the present invention.

DETAILED DESCRIPTION OF THE PREFERRED EMBODIMENTS

A handle for a tool such as a screwdriver is shown as an exterior view in FIG. 1, in cross-section in FIG. 2. The surface of the handle comprises three regions. A first region (11) is the finger region, where contact with the fingers produces the torque needed to rotate a screw. The finger region should thus at least partly have a gripping surface with structure and material suitable for tangential forces between the fingers and the handle. The moulding dies for the gripping surfaces can then have partition lines in this region between the gripping surfaces, but if possible no mould inlet because they would disturb the surface structure.

A second region is the end region (12) against which the palm of the hand is pressed in use. The end region must be able to rotate against the palm with full comfort without scratching and should be made as a fully smooth rotational surface, such as part of a sphere, without partition lines or mould inlets. The end surface is also the part of the handle which is always visible when the tool lies on a table or hangs on a wall, and is thus a suitable location for information symbols.

A third region is the transition region (13) between the finger region (11) and the end region (12). Normally no forces between the hand and the tool are acting there, and it is a suitable place for suspension holes (14), and there are no restrictions for locating partition lines or mould inlets in this region.

According to the invention, the marking is done by producing the end region (12) by successive die moulding using at least two materials with different colours, with the mould inlets outside the end region. Material (17) forming symbols constituting a minor part of the surface of the end region can be injected from inlets (15) in the transition region (13) through channels (16) in the first moulded material (18) of the handle core. If the symbols are fully surrounded by core material (18), the channels can be closed. The inlets (15) can be located either in a part of the transition region (13) which is normally not touched by the hand, or as shown in FIG. 2 in a place which is later covered by a third material (19) forming the gripping surfaces.

The moulding dies for the handle can then be made without partition lines or inlets in the end region (12), and fully smooth for the symbol moulding step, ensuring a smooth comfortable end surface which can easily be rotated against the palm.

For tools subjected to impacts against the end region, such as chisels, a handle according to the invention ensures that the marking will not disappear or become illegible after a number of impacts, because the colour difference goes rather deep with borders approximately vertical to the surface.

What is claimed is:

1. A handle for tools, comprising:

a handle having a finger contact region, an end region, and a transition region therebetween; and said end region being made from at least two plastic materials of different colors to form a visible marking symbol for identification of the tool, at least one molding inlet located in said transition region, and channels in communication with said at least one inlet are disposed within the end region, wherein a first of said two plastic materials is supplied through said channels that are formed in a second of said two plastic materials.

2. The handle according to claim 1, wherein a surface of said end region is shaped as part of a sphere.

3. The handle of claim 1, wherein said end region is rotationally symmetrical.

4. The handle of claim 1, wherein said first of said two plastic materials is surrounded by and integrally formed to said second of said two plastic materials.

* * * * *